US006820883B2

(12) United States Patent
Lang et al.

(10) Patent No.: US 6,820,883 B2
(45) Date of Patent: Nov. 23, 2004

(54) VEHICLE SUSPENSION INCLUDING DOCK HEIGHT HOLDING DEVICE

(75) Inventors: Kenneth G. Lang, Davison, MI (US); James Eckelberry, Canton, OH (US); Steven R. Miller, Clarkston, MI (US); Richard M. Clisch, Canton, MI (US)

(73) Assignee: Meritor Heavy Vehicle Technology LLC, Troy, MI (US)

( * ) Notice: Subject to any disclaimer, the term of this patent is extended or adjusted under 35 U.S.C. 154(b) by 218 days.

(21) Appl. No.: 10/044,853

(22) Filed: Nov. 7, 2001

(65) Prior Publication Data

US 2003/0085543 A1 May 8, 2003

(51) Int. Cl.[7] .............................................. B60G 13/00
(52) U.S. Cl. ..................... 280/124.157; 280/DIG. 1; 267/35; 267/220
(58) Field of Search .................. 280/124.157, 124.158, 280/DIG. 1, 124.153, 124.177; 267/220, 139, 116, 35, 124.153, 124.128, 124.177

(56) References Cited

U.S. PATENT DOCUMENTS

| | | | | |
|---|---|---|---|---|
| 4,527,781 A | * | 7/1985 | Pees et al. | 267/64.24 |
| 4,555,096 A | * | 11/1985 | Pryor | 267/64.21 |
| 5,009,401 A | * | 4/1991 | Weitzenhof | 267/64.21 |
| 5,308,104 A | | 5/1994 | Charles | |
| 5,597,172 A | * | 1/1997 | Maiwald et al. | 280/124.153 |
| 5,921,532 A | | 7/1999 | Pierce et al. | |
| 6,186,486 B1 | * | 2/2001 | Gutman et al. | 267/220 |
| 6,254,072 B1 | * | 7/2001 | Bono et al. | 267/220 |
| 6,485,008 B1 | * | 11/2002 | Griffin | 267/220 |

FOREIGN PATENT DOCUMENTS

| | | |
|---|---|---|
| DE | 23 32 387 A1 | 1/1975 |
| FR | 2 644 735 A1 | 9/1990 |

OTHER PUBLICATIONS

European Search Report dated Feb. 28, 2003.

* cited by examiner

Primary Examiner—Paul N. Dickson
Assistant Examiner—Toan C To
(74) Attorney, Agent, or Firm—Carlson, Gaskey & Olds (57) ABSTRACT

A vehicle suspension includes a dock height holding device. First and second jounce bumper portions preferably each include a surface configuration that faces generally toward the oppositely facing jounce bumper portion. By moving at least one of the jounce bumper portions between first and second alignment positions, the clearance between suspension components is controlled in a manner that controls the height of a truck bed or trailer deck. In one example, each jounce bumper portion includes four projections and four spaced recesses. In the first alignment position the projections on one jounce bumper portion are received within the recesses on the oppositely facing portion during normal driving conditions. In the second alignment position, the projections of the jounce bumper portions engage each other and maintain a larger clearance between the suspension components to ensure an appropriate deck height when the vehicle is parked for loading or unloading.

24 Claims, 4 Drawing Sheets

VEHICLE SUSPENSION INCLUDING DOCK HEIGHT HOLDING DEVICE

BACKGROUND OF THE INVENTION

This invention generally relates to vehicle suspensions. More particularly, this invention relates to an arrangement for maintaining a desired dock height of a vehicle under selected conditions.

Vehicle suspensions are well known. Many arrangements for trucks or other heavy vehicles include air-based suspension components commonly known as air springs. Typical arrangements include a dump valve to exhaust air from the air springs when vehicle parking brakes are applied. As air is evacuated from the air springs, the height of the trailer or rear end of the truck (depending on the vehicle configuration) typically drops from a ride height until an appropriate suspension component rests on a jounce bumper internal to the air springs. It is desirable to exhaust the air from the air springs to provide a stable trailer deck for safely loading and unloading cargo from the trailer or truck.

A difficulty associated with conventional arrangements is that when the trailer or rear end of the truck drops as air is exhausted from the air springs, there is an undesirable mismatch between the trailer deck height and the loading dock height. Under some circumstances, a mismatch between the trailer deck height and the dock height prevents a forklift or other vehicle from moving into and out of the trailer for unloading the cargo.

One proposed solution has been to include a non-dump height control valve such that air is not evacuated from the air springs when parking brakes are applied. This solution is not ideal, however. In many instances, attempting to load or unload a trailer without first exhausting air from the air springs results in undesirable bouncing and creates a possible safety concern. It is best to have the truck or trailer as stable as possible during loading or unloading operations.

Accordingly, there is a need for a safe and stable arrangement that allows loading and unloading a trailer while maintaining a desired height of the deck or bed of the truck or trailer. This invention addresses that need and avoids the shortcomings and drawbacks of prior attempts.

SUMMARY OF THE INVENTION

In general terms, this invention is a vehicle suspension having a dock height holding device. A suspension assembly designed according to this invention includes a first support member attached to a body of the vehicle such as a truck trailer. A second support member moves relative to the first support member. At least one air spring is coupled with the first and second support members. A jounce bumper within the air spring has a first portion supported relative to the first support member and a second portion supported to move with the second support member. The jounce bumper portions each include cooperating surface configurations that maintain a first minimal spacing between the support members when the first and second portions are in a first alignment position. This position is useful during normal driving conditions. The surface configurations on the jounce bumper portions maintain a second spacing between the support members when the first and second jounce bumper portions are in a second alignment position. This position is useful to maintain a dock height during loading or unloading of the truck or trailer, for example.

In one example, each jounce bumper portion surface configuration includes four projections equally spaced about a circumference of the jounce bumper portion. Between each projection is a recess that is sized to receive the projections on the oppositely facing jounce bumper portion. In this example, rotating one of the jounce bumper portions 45 degrees allows moving the jounce bumper portions between the first and second alignment positions.

In another example, the surface configurations of the jounce bumper portions include sloped surfaces that are generally parallel to each other when the jounce bumpers are in the first alignment position. As one of the jounce bumper portions is progressively rotated, the height maintained by the contacting surfaces increases. This particular example provides a wide versatility for adjusting the height holding feature of the inventive device to accommodate the particular needs of a variety of situations.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
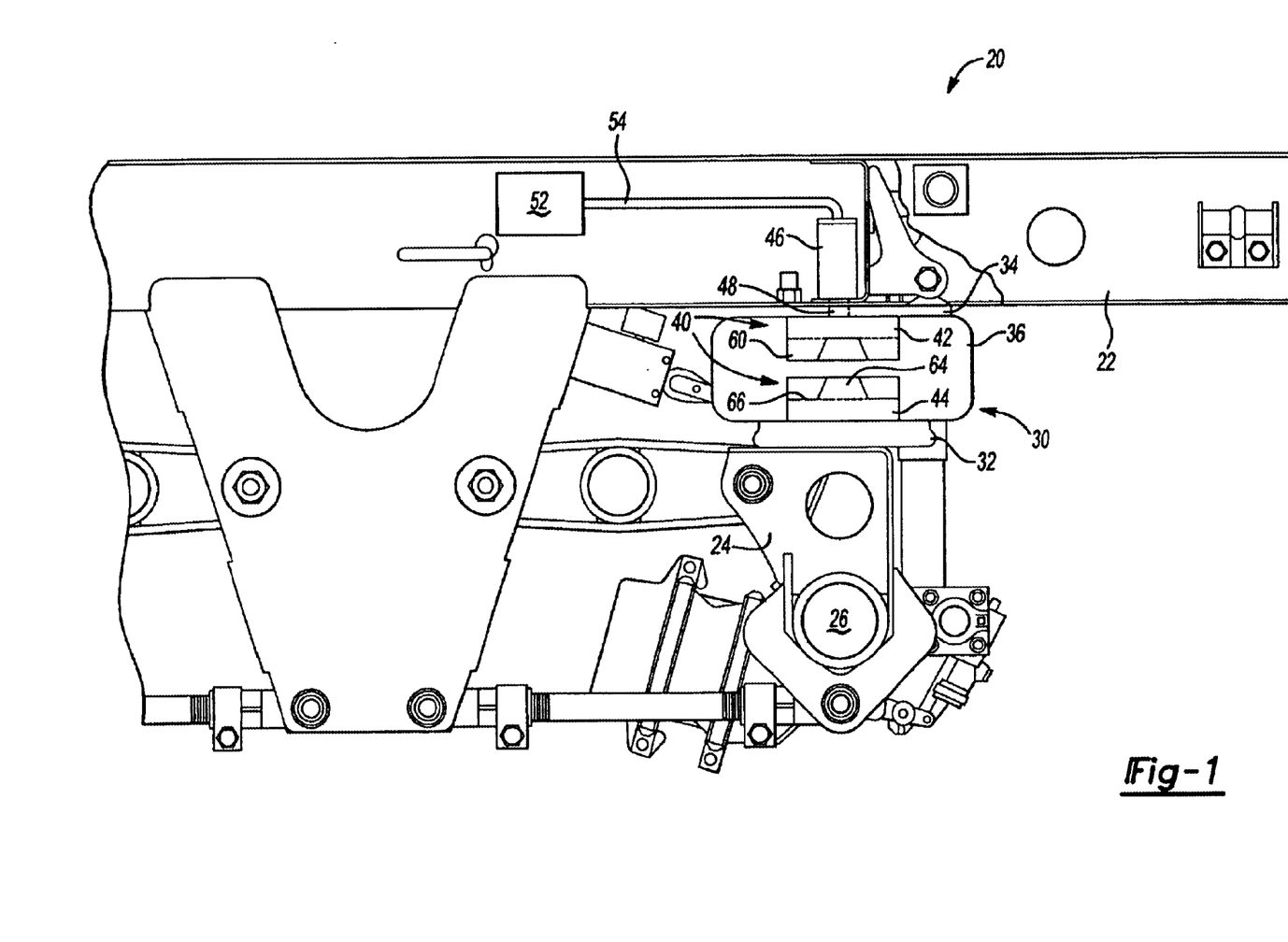
FIG. 1 schematically illustrates selected portions of a vehicle suspension designed according to this invention.

A vehicle suspension assembly 20 is particularly useful for heavy vehicles such as truck and trailer arrangements. The illustrated example is especially useful for truck trailers that are used in carrying a variety of cargo.

The suspension assembly 20 includes a first support member 22 that is supported on the vehicle body in a conventional fashion. The first support member 22 can be referred to as part of the sprung mass of the vehicle. A second support member 24 is supported to move relative to the first support member 22. The second support member 24 is associated with a vehicle axle 26 and can be considered part of the unsprung mass of the suspension arrangement.

An air spring 30 is positioned between the first support member 22 and the second support member 24 to provide damping during the relative movement between the support portions as the vehicle travels along a road surface, for example. The air spring 30 includes a retainer plate 32 that is supported for movement with the second support member 24. An upper bead plate 34 is supported to remain stationary relative to the first support member 22. A bellows portion 36 extends between the retainer plate 32 and upper bead plate 34 and is filled with air in a conventional fashion. Adjusting the air pressure within the bellows 36 adjusts the amount of load carrying capacity provided by the air spring 30.

A jounce bumper device 40 is supported within the bellows portion 36. The jounce bumper 40 includes a first portion 42, which is illustrated as being associated with the upper bead plate 34 and a second portion 44, which is illustrated as being associated with the retainer plate 32. The jounce bumper portions 42 and 44 are operative to insure a desired clearance between the retainer plate 32 and upper bead plate 34 and, therefore, a desired clearance between the first support member 22 and second support member 24.

The first jounce bumper portion 42 is coupled with an actuator 46 through a rod 48. There preferably are seals (not illustrated) at appropriate positions relative to the rod 48 to ensure maintaining a desired air pressure within the spring bellows 36. In the illustrated example of FIG. 2, the first jounce bumper portion 42 is supported on a plate 50 that is directly coupled with the rod 48.

An air source 52 communicates with the actuator 46 through a conduit 54. The illustrated example includes the actuator 46, which preferably is a pneumatically actuated, rotary actuator. Another example includes a linear actuator. When appropriate pressure is supplied from the air source 52, the actuator 46 rotates the rod 48 about its axis. The rod 48 preferably is biased into a rest position relative to the actuator assembly by a biasing member 56. The illustrated example, includes a spring 56 (see FIG. 2). In one example, the rest position corresponds to the position of the jounce bumper portions during normal driving conditions. In another example, the rest position corresponds to a dock height hold alignment.

By utilizing the actuator 46, the alignment between the jounce bumper portions 42 and 44 can be selectively controlled. One alignment position preferably is used during normal driving conditions while another alignment is used to hold a dock height position.

Each of the jounce bumper portions preferably includes a surface profile that facilitates controlling the height maintained between the retainer plate 32 and the upper bead plate 34. The cooperating surface profiles on the jounce bumper portions allow for different heights to be maintained, depending on the orientation of the jounce bumper portions relative to each other. A variety of surface profiles or surface configurations are within the scope of this invention.

In one example, the jounce bumper portions have surface configurations that include a plurality of spaced projections that project in a direction generally toward the oppositely facing jounce bumper portion. The first jounce bumper portion 42 includes a plurality of projections 60 that are interspaced with a plurality of recesses 62. This is best visible in the perspective illustration of FIG. 6. Similarly, the second jounce bumper portion 44 includes a plurality of projections 64 interspaced with a plurality of recesses 66.

Figure 3:
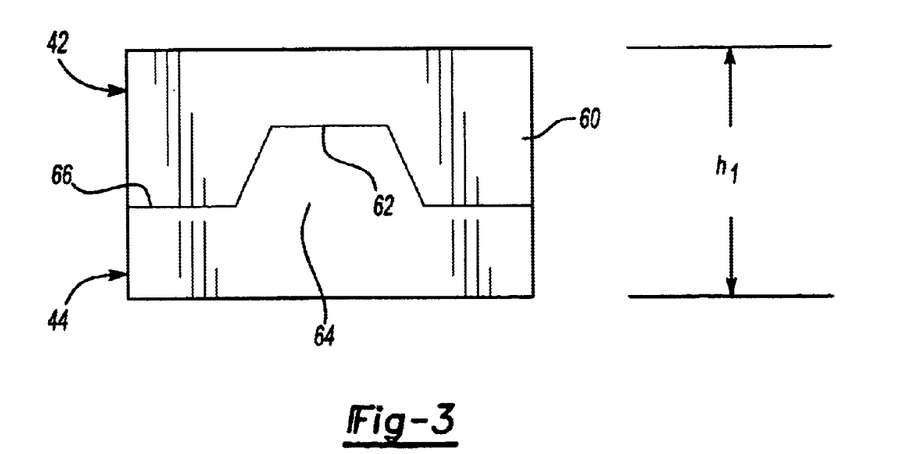
FIG. 3 schematically illustrates an example jounce bumper device designed according to this invention in a first alignment position.

The projections and recesses on each jounce bumper portion preferably are sized so that the projection on one jounce bumper portion is received within the recess (i.e., between projections) on the oppositely facing jounce bumper portion when the jounce bumpers are in a first alignment position. This provides a jounce bumper during normal driving conditions. This is shown, for example, in FIG. 3 where the projections 60 on the jounce bumper portion 44 are received within the recessed portions 66 on the second jounce bumper portion 44. Similarly, the projections 64 on the second jounce bumper portion 44 are received between the projections 60 on the first jounce bumper portion 42 or within the recesses 62. This first alignment position ensures that a minimum clearance $h_1$ is maintained between the upper bead plate 34 and the retainer plate 32. In the first alignment position, the jounce bumper portions can be considered to be in phase.

Figure 4:
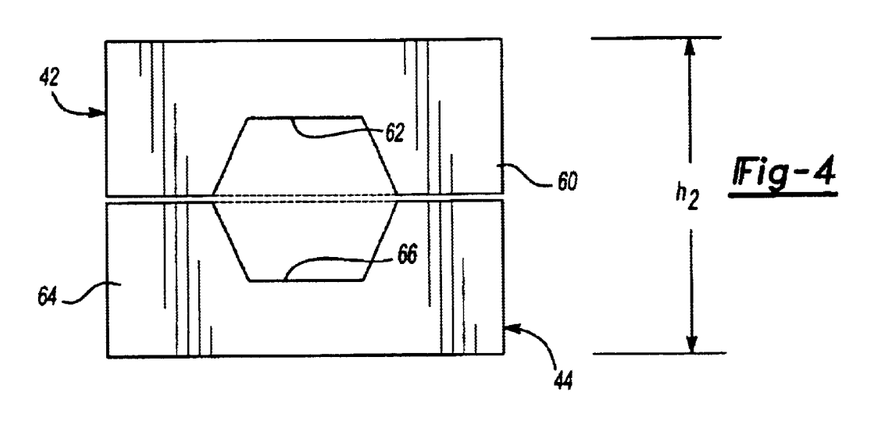
FIG. 4 illustrates the embodiment of FIG. 3 in a second alignment position.

By utilizing the actuator 46, the first jounce bumper portion 42 can be moved so that the jounce bumper portions are in a second alignment position. The preferred arrangement includes a second position where the projections on one jounce bumper contact or engage the projections on the other jounce bumper portion. This is illustrated, for example, in FIG. 4 where the projections 60 on the portion 42 abut or engage the projection 64 on the jounce bumper portion 44. In this alignment position, the jounce bumper portions ensure a minimum clearance $h_2$ between the retainer plate 32 and bead plate 34 such that a minimum height $h_2$ between the first support member 22 and second support member 24 is maintained. This position corresponds to holding the deck or bed of a dock height when the parking brakes are applied.

Figure 6:
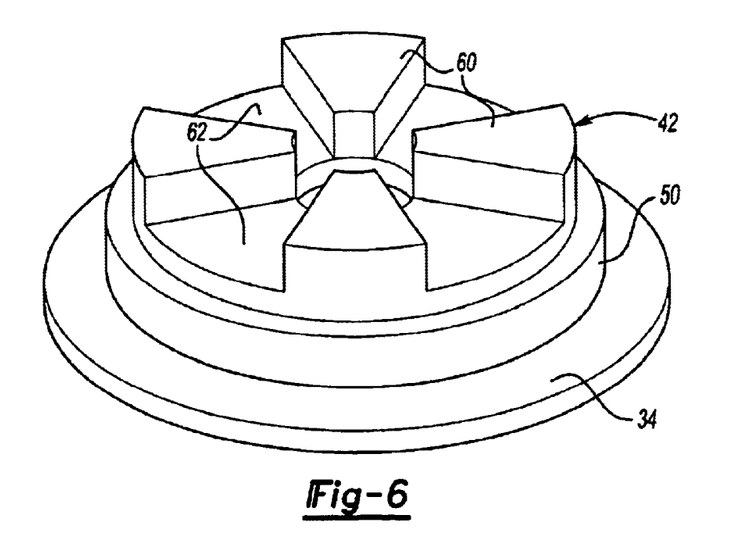
FIG. 6 is a perspective illustration of a jounce bumper portion designed according to this invention.

In the example of FIG. 6, a relative rotation between the jounce bumper portions of 45 degrees is sufficient to change the alignment position. If more or less projections are used, different amounts of rotation will suffice.

Figure 5:
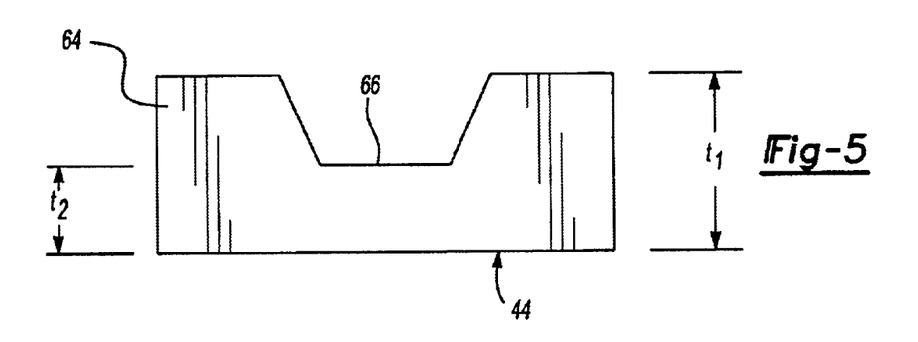
FIG. 5 schematically illustrates dimensional characteristics of a jounce bumper portion designed according to this invention.

By selecting the dimensions of the jounce bumper portions, the appropriate height or clearances are maintained. This can be appreciated from FIG. 5, for example, by selecting a thickness $t_1$ of the jounce bumper which defines the height of each of the projections 64 and the thickness $t_2$ at the recess portions, the appropriate clearance dimensions are maintained. Those skilled in the art who have the benefit of this description will be able to select appropriate dimensions to achieve the results needed in a particular situation.

Figure 7:
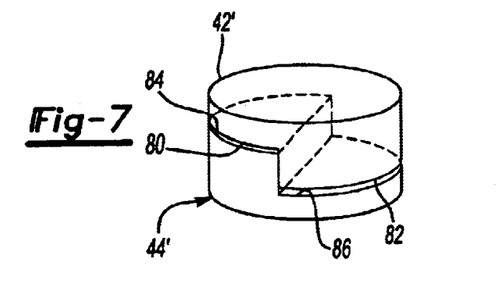
FIG. 7 schematically illustrates another example jounce bumper device designed according to this invention in a first alignment position.
Figure 8:
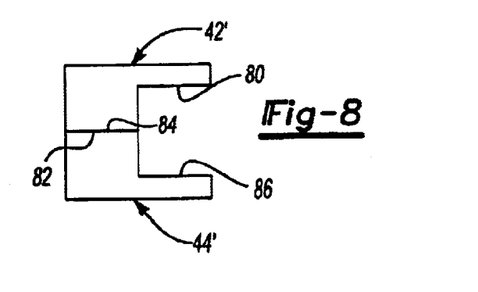
FIG. 8 illustrates the embodiment of FIG. 7 in a second alignment position.

FIGS. 7 and 8 illustrate another example jounce bumper device having a surface configuration different than that shown in FIGS. 3 through 6. In the example of FIGS. 7 and 8, the surface configurations include two surface levels, each covering approximately half of the surface area of the jounce bumper. The jounce bumper portion 42' includes a first level 80 and a second level 82. The other jounce bumper portion 44' includes a first level 84 and a second level 86. As shown in FIG. 7, when the surfaces 80 and 84 are aligned and the surfaces 82 and 86 are aligned, the jounce bumper device is arranged for normal driving conditions.

In a second alignment position, as shown in FIG. 8, when the jounce bumper portion 42' has been rotated 180° from the position shown in FIG. 7, the jounce bumper portions are aligned to hold a dock height. In this position, the surfaces 82 and 84 are aligned to contact each other so that the dock height of the truck bed is maintained even when air is released from the air springs.

Figure 9:
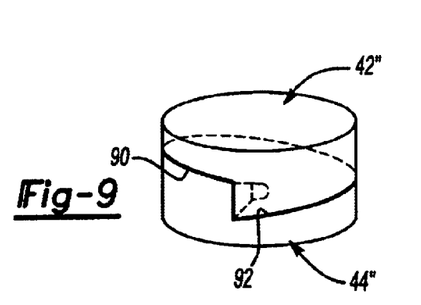
FIG. 9 schematically illustrates another example jounce bumper device designed according to this invention in a first alignment position.
Figure 10:
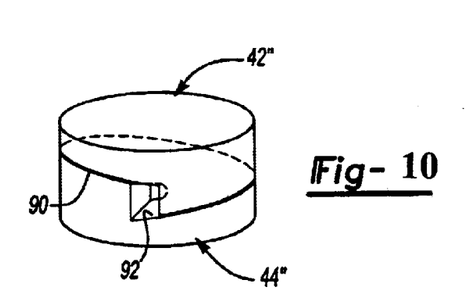
FIG. 10 illustrates the embodiment of FIG. 9 in a second position.

Another example is shown in FIGS. 9 and 10. FIG. 9 shows a first alignment position where the jounce bumper portion 42" has a helically sloped surface 90 that is in engagement with a correspondingly helically sloped surface 92 on the other jounce bumper portion 44". The sloped surfaces 90 and 92 allow a progressive increase in the height maintained by the jounce bumper portions. As can be appreciated from the figures, by incrementally moving the jounce bumper portions 42" and 44" relative to each other, the height maintained by the contacting surfaces on the jounce bumper portions can be progressively increased. In other words, rotating one of the jounce bumper portions 10° provides a first dock height holding position while rotating it 30°, for example, provides a second, higher dock height holding position. The position shown in FIG. 10 shows about a 20° rotation compared to the position shown in FIG. 9. The maximum rotation preferably is less than 360° between the extreme lowest and highest positions available using that particular embodiment.

Figure 11:
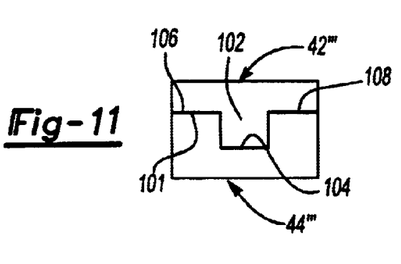
FIG. 11 schematically illustrates another example jounce bumper device designed according to this invention is a first alignment position.
Figure 12:
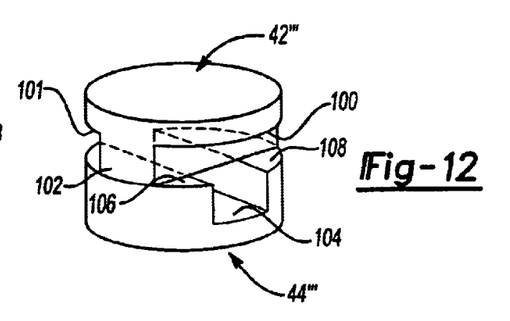
FIG. 12 illustrates the embodiment of FIG. 11 in a second alignment position.

FIGS. 11 and 12 illustrate another example jounce bumper device designed according to this invention. In this example, the first jounce bumper portion 42''' includes two cutaway sections 100 and 101. An extending section 102 extends across the diameter of the jounce bumper portion and is centered between the cutaway portions 100 an 101. The other jounce bumper portion 44''' includes a recessed portion 104 and two raised surfaces 106 and 108.

In the position of FIG. 11, the extending portion 102 is received within the recess 104 so that the jounce bumper portions are aligned in a normal driving position. As shown in FIG. 12, one of the jounce bumper portions has been rotated 90° compared to the position illustrated in FIG. 11. This position maintains a dock height clearance between the support members of the suspension assembly. As can be appreciated from the drawings, the example embodiment of FIGS. 11 and 12 does not require a full 90° rotation to have the jounce bumper portions aligned in a position to maintain the dock height. The only requirement is that the extension portion 102 engage the surfaces 106 and 108 rather than being received within the recess 104.

Figure 13:
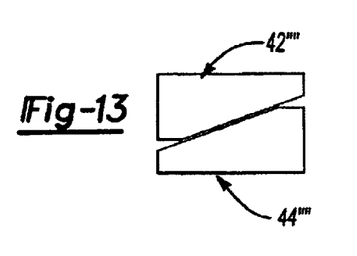
FIG. 13 schematically illustrates another example jounce bumper device designed according to this invention.
Figure 14:
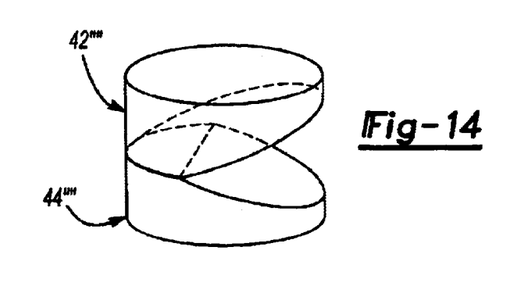
FIG. 14 shows the example of FIG. 13 in another alignment position.

Still another example arrangement is shown in FIGS. 13 and 14.

The preferred materials for making the jounce bumper portions include elastomeric materials with suitable hardness to provide the necessary operation of a jounce bumper during driving conditions while also providing the desired stability in a loading or unloading situation. Example materials include rubber, plastic or other composites. Those skilled in the art who have the benefit of this description will be able to select from among commercially available materials to achieve the results needed for a particular situation.

The jounce bumper portions preferably are maintained in the first alignment position during normal driving conditions. When the vehicle parking brake is set, however, the jounce bumper portions preferably are automatically moved into the second alignment position.

Figure 2:
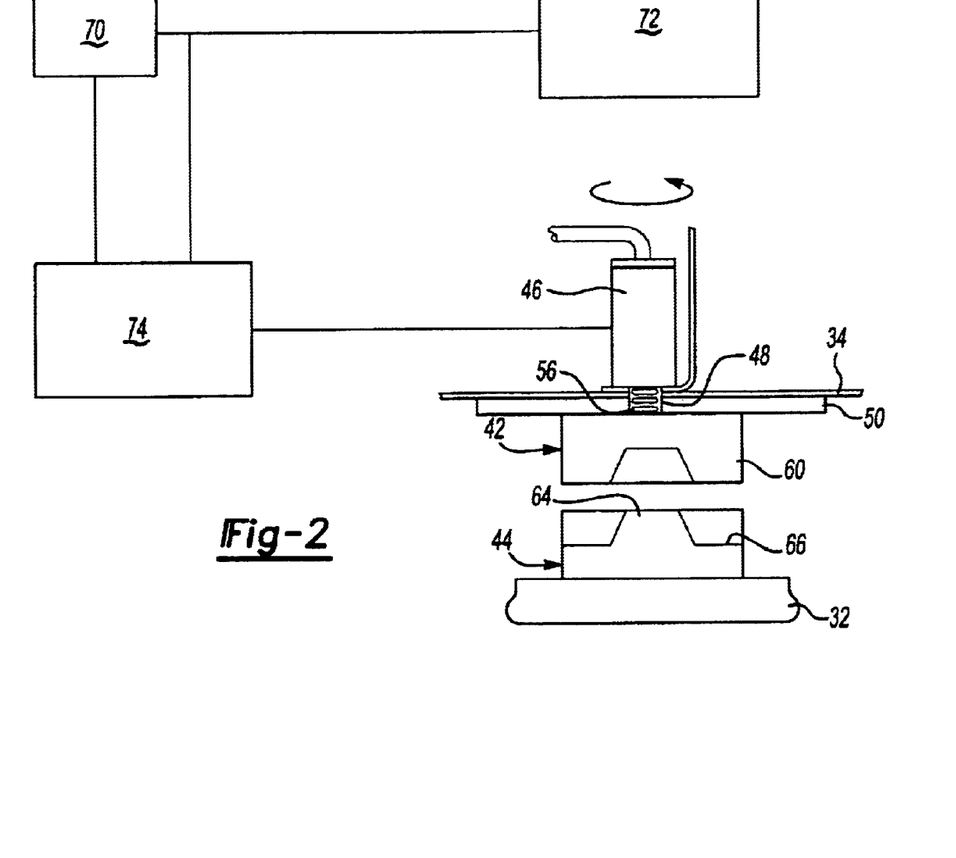
FIG. 2 schematically illustrates selection portions of the example illustration of FIG. 1 with additional control components.

One way of implementing this control strategy can be appreciated from FIG. 2. A parking brake actuator 70 controls the operation of a parking brake assembly 72. A jounce bumper controller 74 preferably communicates with at least one of the parking brake actuator 70 or the braking brake assembly 72. The illustrated example shows communication between the controller 74 and the actuator 70 and the parking brake 72. In one example, the actuator controller 74 receives an air or pneumatic signal from the parking brake assembly 72, which is indicative that the parking brake is applied. This can be accomplished, for example, in spring applied, air release parking brakes where an air chamber is pressurized to overcome the bias of a spring that applies the parking brake. The controller 74 receives a pressure signal from the air spring chamber indicating whether the parking brake is applied. Whenever the parking brake is applied, the controller 74 preferably causes air pressure from the air source 52 to be supplied to the actuator 46 causing the jounce bumper portions to be moved into the second alignment position. Whenever the parking brake is not applied, pressure preferably is released from the actuator 46 and the spring 56 preferably returns the rod 48 and, therefore, the jounce bumper portion 42 back into the first alignment position.

This invention provides a unique jounce bumper assembly that provides the ability to maintain a desired height of a truck trailer or bed when the vehicle is parked and the parking brake is set. At the same time, this invention permits evacuation of air pressure from the air springs so that a more stable and safe loading surface exists. By moving the jounce bumper portions between the first alignment position and the second alignment position, this invention provides a dock height holding device that conveniently fits within the current vehicle packaging constraints and provides a stable and reliable arrangement.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A vehicle suspension assembly, comprising:
   a first support member attached to a body of the vehicle;
   a second support member that moves relative to the first support member;
   at least one air spring coupled with the first and second support members; and
   a jounce bumper within the air spring having a first portion supported relative to the first support member and a second portion supported to move with the second support member, the jounce bumper portions each including a surface configuration that maintains a first minimal spacing between the support members when the first and second portions are in a first alignment position, and maintains a second spacing between the support members when the first and second portions are in a second alignment position, the jounce bumper portions each having a body with an axis near a center of the body, the jounce bumper portions being coaxially aligned and at least one of the jounce bumper portions rotating about the axis for adjusting the alignment.

2. The assembly of claim 1, wherein the surface configuration includes at least one projection on each jounce bumper portion and wherein the projections do not contact each other when the first and second portions are in the first alignment position.

3. The assembly of claim 2, wherein the at least one projection on the first portion is positioned to contact the at least one projection on the second portion when the first and second portions are in the second alignment position.

4. The assembly of claim 2, wherein the projections comprise wedge shaped pieces that extend in an axial direction and are circumferentially spaced about the bumper portions, respectively.

5. The assembly of claim 4, wherein the projections are interdigitated with spaces between the projections and wherein the projections on the first portion are aligned with the spaces on the second portion when the bumper portions are in the first alignment position.

6. The assembly of claim 1, wherein the jounce bumper portions surface configurations each include a sloped surface and wherein the sloped surfaces are in a generally parallel alignment when the jounce bumper portions are in the first alignment position.

7. The assembly of claim 1, including an actuator that is operative to selectively move at least one of the jounce bumper portions to selectively move the portions into the first or second alignment position.

8. The assembly of claim 7, wherein the actuator is a hydraulically powered rotary actuator that rotates at least one of the jounce bumper portions.

9. The assembly of claim 7, including an air source that is supported on the vehicle and is operative to control the application of a parking brake on the vehicle and wherein the air source provides a control signal to the actuator that is indicative of a desired alignment of the bumper portions.

10. An air spring assembly, comprising:
a bead plate that is adapted to be supported on a first portion of a vehicle suspension;
a retainer plate that is adapted to be supported on a second portion of the vehicle suspension, which is moveable relative to the first suspension portion;
a first bumper portion supported on the bead plate, having a body with an axis near a center of the body and having a first surface configuration;
a second bumper portion supported on the retainer plate, having a body with an axis near a center of the body and having a second surface configuration; and
wherein the bumper portions are coaxially aligned and at least one of the bumper portions is selectively rotated about the axis such that the surface configurations on the bumper portions selectively maintain a desired spacing between the bead plate and the retainer plate.

11. The assembly of claim 10, wherein a first spacing is maintained when the first and second bumper portions are in a first alignment position, and a second spacing is maintained when the first and second bumper portions are in a second alignment position.

12. The assembly of claim 11, wherein the first surface configuration includes at least one projection that extends in a direction toward the retainer plate and the second surface configuration includes at least one projection that extends toward the bead plate.

13. The assembly of claim 11, wherein the projection on the first portion is positioned to contact the projection on the second portion when the first and second portions are in the second alignment position.

14. The assembly of claim 10, including an actuator that is operative to selectively move at least one of the bumper portions to selectively align the portions.

15. The assembly of claim 10, wherein the first surface configuration includes a sloped surface and the second surface configuration includes a sloped surface and wherein at least a portion of one of the sloped surfaces is positioned to contact at least a portion of the other sloped surface to maintain the desired spacing between the bead plate and the retainer plate.

16. The assembly of claim 10, wherein the surface configurations each include projections that comprise wedge shaped pieces that extend in an axial direction and are circumferentially spaced about the bumper portions, respectively.

17. The assembly of claim 16, wherein the projections are interdigitated with spaces between the projections and wherein the projections on the first portion are aligned with the spaces on the second portion when the bumper portions are in a first alignment position and the projections on the first portion are aligned with the projections on the second portion when the bumper portions are in a second alignment position.

18. A jounce bumper for use in a vehicle suspension, comprising:
a first elastomeric portion having a first surface configuration; and
a second elastomeric portion having a second surface configuration that cooperates with the first surface configuration so that a total thickness of the first and second portions is selectively varied depending on the alignment between the first and second portions.

19. The jounce bumper of claim 18, wherein the first surface configuration includes at least one projection extending toward the second portion and wherein the second surface configuration includes at least one projection extending toward the first portion.

20. The jounce bumper of claim 19, wherein the first surface configuration includes a plurality of projections interdigitated with a plurality of recesses and the second surface configuration includes a corresponding plurality of projections interdigitated with a plurality of recesses and wherein the recesses on each portion are sized to selectively receive the projections on the other portion.

21. The jounce bumper of claim 18, wherein each portion has a body with an axis near a center of the body, the portions being coaxially aligned and wherein each body is at least partially wedge shaped so that the first and second surface configurations include cooperating sloped surfaces.

22. A vehicle suspension assembly, comprising:
a first support member attached to a body of the vehicle;
a second support member that moves relative to the first support member;
at least one air spring coupled with the first and second support members; and
a jounce bumper within the air spring having a first portion supported relative to the first support member and a second member supported to move with the second support member, the jounce bumper portions each including a surface configuration that maintains a first minimal spacing between the support members when the first and second portions are in a first alignment position, and maintains a second spacing between the support members when the first and second portions are in a second alignment position, the surface configuration of each jounce bumper portion including at least one projection that comprises a wedge shaped piece that extends in an axial direction and the projections are circumferentially spaced about the bumper portions, respectively, the projections being interdigitated with spaces between the projections and wherein the projections on the first portion are aligned with the spaces on the second portion when the bumper portions are in the first alignment position such that the projections do not contact each other when the first and second portions arc in the first alignment position, the at least one projection on the first portion contacting the at least one projection on the second portion when the first and second portions are in the second alignment position.

23. The assembly of claim 22, wherein there are a plurality of projections and a plurality of interdigitated spaces on each of the bumper portions.

24. An air spring assembly, comprising:

a bead plate that is adapted to be supported on a first portion of a vehicle suspension;

a retainer plate that is adapted to be supported on a second portion of the vehicle suspension, which is moveable relative to the first suspension portion;

a first bumper portion supported on the bead plate and having a first surface configuration;

at second bumper portion supported on the retainer plate and having a second surface configuration; and wherein the bumper portions are selectively aligned such that the surface configurations on the bumper portions selectively maintain a desired spacing between the bead plate and the retainer plate, the surface configurations each including projections that comprise wedge shaped pieces that extend in an axial direction and are circumferentially spaced about the bumper portions, respectively, the projections being interdigitated with spaces between the projections and wherein the projections on the first portion are aligned with the spaces on the second portion when the bumper portions are in a first alignment position and the projections on the first portion are aligned with the projections on the second portion when the bumper portions are in a second alignment position.

* * * * *

UNITED STATES PATENT AND TRADEMARK OFFICE
CERTIFICATE OF CORRECTION

PATENT NO. : 6,820,883 B2
DATED : November 23, 2004
INVENTOR(S) : Lang et al.

It is certified that error appears in the above-identified patent and that said Letters Patent is hereby corrected as shown below:

Column 8,
Line 60, "arc" should read as -- are --.

Signed and Sealed this

Twenty-second Day of February, 2005

JON W. DUDAS
*Director of the United States Patent and Trademark Office*